United States Patent [19]

Stein

[11] Patent Number: 5,771,468
[45] Date of Patent: Jun. 23, 1998

[54] MULTI-PURPOSE BASE STATION

[75] Inventor: Per Stein, Stockholm, Sweden

[73] Assignee: Telefonaktiebolaget L M Ericsson, Stockholm, Sweden

[21] Appl. No.: 587,493

[22] Filed: Jan. 17, 1996

[51] Int. Cl.$^6$ .................................................. H04Q 7/30
[52] U.S. Cl. ........................... 455/561; 455/575; 455/90; 455/403; 455/558
[58] Field of Search .................................... 455/561, 403, 455/426, 11.1, 560, 74, 74.1, 558, 90, 442, 450, 575; 370/466, 467, 422; 235/472

[56] References Cited

U.S. PATENT DOCUMENTS

| | | | |
|---|---|---|---|
| 4,525,605 | 6/1985 | Wever et al. . | |
| 4,694,484 | 9/1987 | Atkinson et al. | 455/561 |
| 4,777,633 | 10/1988 | Fletcher et al. . | |
| 4,887,265 | 12/1989 | Felix | 455/450 |
| 4,949,373 | 8/1990 | Baker, Jr. et al. . | |
| 5,018,051 | 5/1991 | Yamada et al. . | |
| 5,020,090 | 5/1991 | Morris . | |
| 5,028,806 | 7/1991 | Stewart et al. . | |
| 5,029,199 | 7/1991 | Jones et al. . | |
| 5,157,247 | 10/1992 | Takahira . | |
| 5,183,404 | 2/1993 | Aldous et al. . | |
| 5,185,700 | 2/1993 | Bezos et al. . | |
| 5,202,838 | 4/1993 | Inoue . | |
| 5,218,547 | 6/1993 | Tebbs . | |
| 5,227,957 | 7/1993 | Deters . | |
| 5,234,351 | 8/1993 | Dixon . | |
| 5,278,892 | 1/1994 | Bolliger et al. | 455/442 |
| 5,396,543 | 3/1995 | Beeson et al. | 455/560 |
| 5,436,955 | 7/1995 | Kaewell et al. | 455/561 |
| 5,471,471 | 11/1995 | Freeburg et al. | 455/560 |
| 5,533,029 | 7/1996 | Gardner | 370/329 |
| 5,544,222 | 8/1996 | Robinson et al. | 370/422 |
| 5,628,055 | 5/1997 | Stein | 455/575 |
| 5,640,002 | 6/1997 | Ruppert et al. | 235/472 |
| 5,644,602 | 7/1997 | Critchlow et al. | 375/308 |

FOREIGN PATENT DOCUMENTS 0 670 638 A2   1/1995   European Pat. Off. .

OTHER PUBLICATIONS

Fisher et al., "Advanced Mobile Phone service", AT&T, vol. 58, No. 1, pp. 153–199, Jan. 1979.
AT&T Technology, vol. 5, No. 4, 1990, NEW YORK US, pp. 20–25, XP000220356; Hardy, W.J., Et Al.,: "*New Autoplex Cell Site Paves The Way For Digital Cellular Communications*", p. 20, right–hand column, line 26–line 35, p. 22, left–hand column, line 17—right–hand column, line 9.
International Switching Symposium 1990, "*Innovations In Switching Technology*", Stockholm, SE, May 28–Jun. 1, 1990, vol. 4, No. SYMP. 13, pp. 195–198, XP000130984, Henn, R.W., Et Al.: AT&T Next Generation Digital Cellular Base Station Technology, p. 196, right–hand column, line 18–line 28.
ICC '95 Seattle, Communications—Gateway To Globalization, 1995, IEEE International Conference On Communications (Cat. No. 95CH35749), Seattle, WA, USA, pp. 18–22, JUN. 1995, ISBN 0–7803–2486–2, PP. 410–416, vol. 1, XP000533020, P. Agrawal, Et Al.: "*A Testbed For Mobile Networked Computing*", p. 411, right–hand column, line 19–Line 30, Figure 3.

*Primary Examiner*—Dwayne D. Bost
*Assistant Examiner*—Jean D. Aristilde
*Attorney, Agent, or Firm*—Jenkens & Gilchrist, P.C.

[57] ABSTRACT

The invention provides a modular base station for use in a plurality of telecommunications systems where the systems operate according to different standards. The base station comprises a chassis having means for removably mounting system components to allow system components to be removed and replaced for operation in telecommunications systems operating according to varying standards. In a two system embodiment of the invention, logic circuitry and RF circuitry for each of the two systems is mounted in four PCMCIA slots. The base station can be used in either of the two systems depending on which systems control signals are received. When it is desired to use the base station in a third system that operates according to a third standard, the logic and RF circuitry of one of the systems can be replaced with circuitry capable of operation in the third system.

10 Claims, 11 Drawing Sheets

FIG. 1B
Outdoor usage

FIG. 1A
Inhouse usage

MULTI-PURPOSE BASE STATION

BACKGROUND OF THE INVENTION

1. Field of the Invention

The present invention relates to modular electronic equipment and, more particularly, to a modular base station capable of being used in a plurality of cellular telecommunications systems, each of which operates according to a different system standard.

2. History of the Prior Art

Cellular telecommunications is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length. Similarly, wires connect the telephone outlet with a local switching office of the telephone company. A telephone user's movement is thus restricted not only by the length of the telephone cord, but also by the availability of an operative telephone outlet, i.e. an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others. In a typical cellular radio system, the user, or the user's vehicle, carries a relatively small, wireless device which communications with a base station that connects the user to other mobile stations in the system and to landline parties in the public switched telephone network (PSTN).

A cellular system can operate according to many different standards. Mobile phone system standards currently in use in the United States include the Advanced Mobile Phone System network (AMPS), which operates in analog mode, and the newly developed IS-54 dual mode system, which operates in either analog or digital mode. Other cellular phone system standards in use throughout the world include Personal Digital Cellular (PDC) in Japan, various code division multiple access (CDMA) standards, the Cellular Digital Packet Data (CDPD) standard, the Nordic Mobile Telephone (NMT) and Total Access Communications System (TACS) analog systems, and the newly developed Global System for Mobile Communications (GSM) standard.

Each of the system standards defines the specific frequencies, data rates, data formats, and related parameters for both voice and data communications between the base stations and mobile units of the particular system. These systems vary from each other in many aspects of operation. Each of the standards requires unique equipment and electronics for the mobile units and base stations which make up the system conforming to that particular standard. A mobile unit or base station which can be used in one system generally will not operate in another system. The older analog systems transmit voice signals by analog modulation techniques, while the newer digital systems transmit digitally modulated voice signals. Each analog system may use a different frequency to carry modulated voice signals. The various digital systems also differ from each other. For example, the IS-54 system uses differentially encoded quadrature phase shift keying (DQPSK) while the GSM system uses Gaussian minimum shift keying (GMSK) to modulate data. In addition to the aforementioned mobile phone systems, other related systems such as paging (both local and global), and DECT (Digital European Cordless Telecommunications) have been developed which also operate according to different standards. Also, in addition to these existing systems, other systems are constantly under development. For example, personal communications services (PCS) frequency bands in the 1800–2000 Mhz range have been allocated to system operators in the United States; and PCS systems are presently being implemented.

Because the telecommunication systems vary so widely, and because new systems and system standards are constantly being developed as replacements for existing systems, it would be an advantage to have system components easily upgradable to new system standards or compatible for use in more than one existing system. A cellular system base station would be one such component in which upgradability or compatibility to a different system would be an advantage. The present invention provides such a portable cellular base station.

SUMMARY OF THE INVENTION

The present invention provides a modular base station modifiable for use in a plurality of telecommunications systems each of which operates according to different standards. This invention allows a flexible response to the varying requirements on base station equipment, when the base station comprising the chassis is to be used in telecommunications systems operating according to different standards. A base station designed according to the teachings of the invention is easily and quickly modifiable for use in systems operating according to different wireless standards.

A system operator desiring to use the base station in a new system would replace the relevant components in the base station with components necessary for operation in the new system. If the system operator desired to upgrade its equipment, the operator could retain its existing base stations, and make only the modifications necessary to allow the base station to be used in the upgraded system. The system owners would be able to purchase only the replacement components necessary for modification instead of the complete base stations. This would allow savings in cost. It would also shorten the time necessary to upgrade a system as only modified components need be replaced. An easily modifiable base station would also be advantageous cost-wise for a system operator who operates systems of different types. Such an operator could purchase one basic type of base station and use this in various systems by making modifications necessary for use in a particular system. This would result in cost savings through economies of scale. This would also result in increased uniformity throughout the cellular industry of components which are not unique to a specific system. This uniformity would result in cheaper and faster repairs as spare parts of certain types could be stockpiled.

In one aspect the invention provides a modular base station comprising a chassis having means for removably mounting a plurality of components of various telecommunications systems. Each mounting means is connected to a bus structure that allows electrical communication between components mounted in the separate mounting means. The base station also comprises a first interface capable of being connected to telecommunications networks. A second interface connected between the bus structure and the first interface provides a communication path between the system components and the telecommunications network.

In a second aspect the invention provides a modular base station in which the means for removably mounting comprise card slots, with each card slot adapted to removably receive PC cards containing components of various telecommunications systems.

In another aspect the invention provides a modular base station comprising a chassis in which the means for removably mounting comprise PC & Memory Card International Association (PCMCIA) PC card slots.

In a further aspect the invention provides a modular base station in which the means for removably mounting comprise two PCMCIA PC card slots. The base station is configured so that a single system can be implemented in the base station at one time. A RF circuitry card and a logic circuitry card may each be mounted in one of the two slots.

In a still further aspect the invention provides a modular base station in which the means for removably mounting comprise four PCMCIA PC card slots. The base station is configured so that two systems can be implemented simultaneously in the base station. Two of the four PCMCIA slots may be allocated to each system. An RF circuitry card and a logic card may each be mounted in one of the two slots allocated to each system.

BRIEF DESCRIPTION OF THE DRAWINGS

For a more complete understanding of the present invention and for further objects and advantages thereof, reference may now be made to the following description, taken in conjunction with accompanying drawings, in which.

DETAILED DESCRIPTION

The present invention is a modular base station which is designed to be used as a cordless telephone system base station or a cellular system micro base station. The modular base station has a variety of possible applications.

Figure 1A:
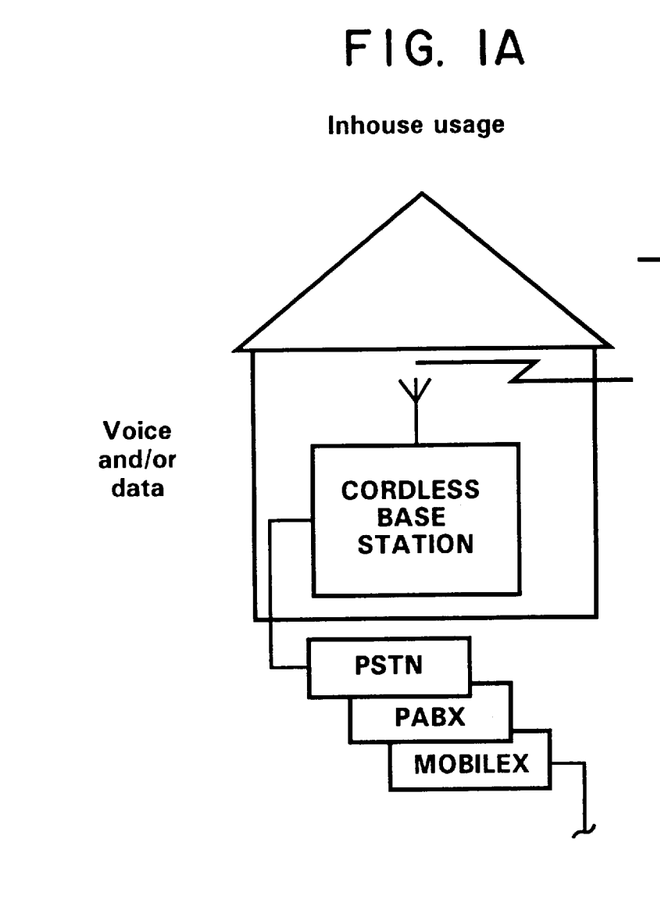
FIGS. 1A and 1B illustrate possible applications of a modular base station designed according to the teachings of the invention.
Figure 1B:
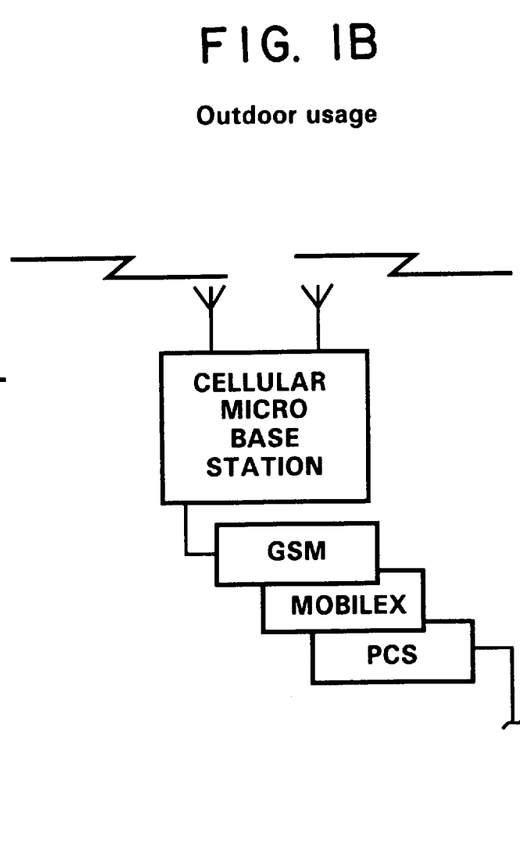

FIGS. 1A and 1B illustrate possible applications of a modular base station designed according to the teachings of the invention. FIG. 1A is a block diagram which illustrates the possible uses of a base station designed according to the teachings of the invention when used as a cordless base station. A cordless base station which operates according to the principles of the present invention could be connected to the public switched telephone network (PSTN), a PBX, a personal communication system (PCS) or Wide-Area Local Access Network(W-LAN).

FIG. 1B is a block diagram which illustrates the possible uses of a base station designed according to the teachings of the invention when used as a cellular micro base station. A cellular micro base station which operates according to the principles of the present invention may be connected to voice or data network utilizing cellular principles. Such a network may be a GSM, D-AMPS, PDC, Mobitex, PCS, AMPS, NMT, TACS, CDMA, CDPD or a Paging Network.

The base station of the present invention utilizes plug-in modules conforming to a standard interconnection format. Plug-in modules designed to perform various functions and conforming to the standard interconnection format can be used within the base station. Plug-in modules conforming to the standard format can be changed when the user wishes to change functions provided by these plug-in modules, or new plug-in modules with additional functions can be added.

As an example of the type of plug-in modules that may be used, there has been a recent movement toward standardizing the interconnection formats for use in circuit cards for personal computers. In particular, the PC & Memory Card International Association (PCMCIA) was formed with the goal of promoting the interchangeability of integrated circuit and memory cards among computer and other types of electronic products. The PCMCIA has promulgated certain physical and electrical standards to ensure that cards can be used in different types of equipment. Both data storage, i.e. memory, and peripheral expansion, i.e. I/O, card types constructed in accordance with these standards are compatible with connectors which are also constructed in accordance with the standards. Therefore, computer systems using the PCMCIA format will be able to exchange modules. This compatibility expands the number of functions performable in computer systems conforming to the PCMCIA format. The PCMCIA standard is set forth in a variety of documents including the PCMCIA PC Card Standard, Release 2.0, incorporated by reference herein. The standard sets forth a 68 pin interchange for I/O type circuit cards.

Figure 2A:
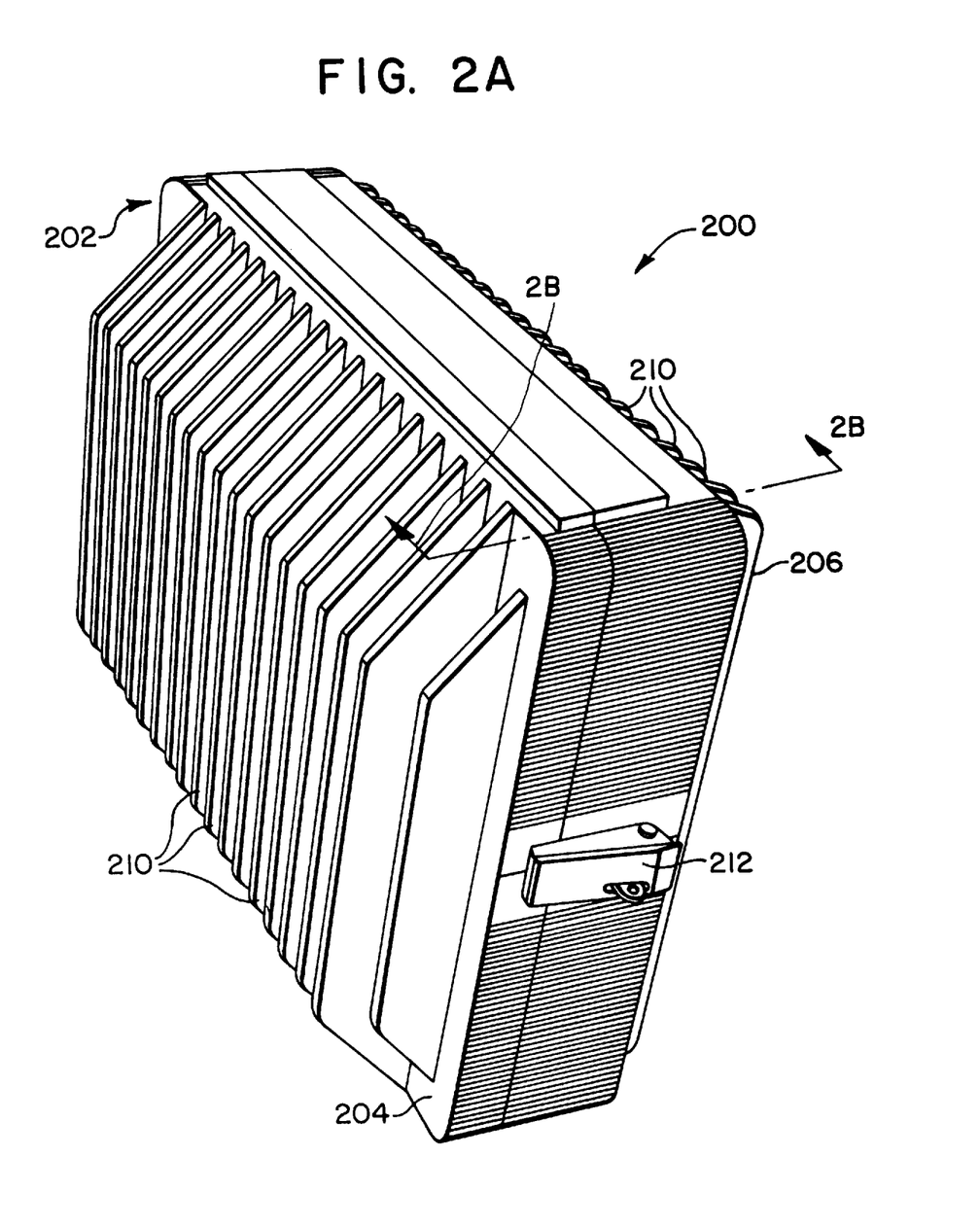
FIG. 2A is a front right perspective view of a portable base station incorporating the teachings of the present invention.

Referring now to FIG. 2A, FIG. 2A is a front right perspective view of a portable modular Base Station 200 incorporating the principles of the present invention. The base station is enclosed by an aluminum case 202. The case 202 opens like a suitcase to allow access to the internal electronics of the base station 200. A carrying handle (not shown) is attached to the bottom of the base station 200 so that the base station may be turned upside down and transported like a suitcase.

The case 202 is made up of a cover 204 and a wall section 206 connected to cover 204. The cover 204 and wall section 206 may be connected by hinges (not shown). Cooling fins 210 are attached to the outside surfaces of the cover 204 and wall section 206. The case 202 may be opened by releasing latches on both sides of the case 200. The right side latch 212 is shown in FIG. 2A. When the latches have been opened the cover 204 can be opened by pulling it upward so that it rotates along the axis formed along the hinges.

Figure 2B:
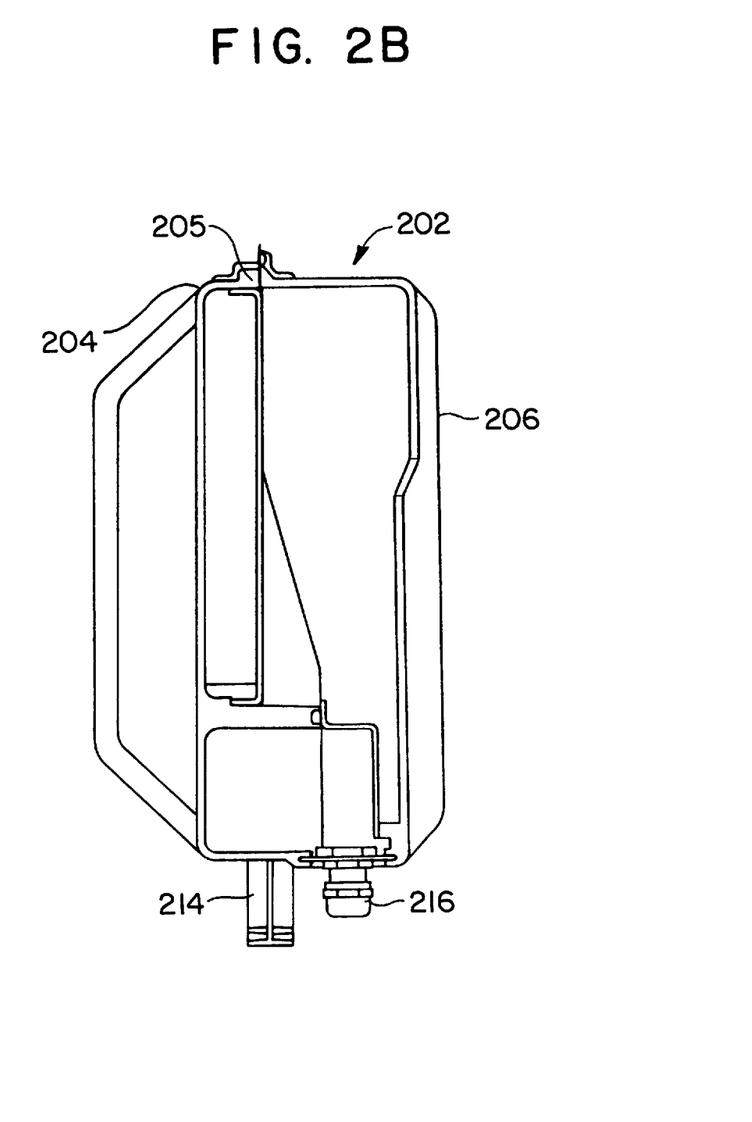
FIG. 2B is a right side elevational view of the base station of the invention taken along line 2B—2B of FIG. 2A.

FIG. 2B is a right side elevational, cross-sectional view of the aluminum case 202 of FIG. 2A taken along the lines 2C—2C thereof. FIG. 2B shows the carrying handle 214 mounted on the cover 204 and BNL connectors 216 mounted on the wall section 206.

Figure 2C:
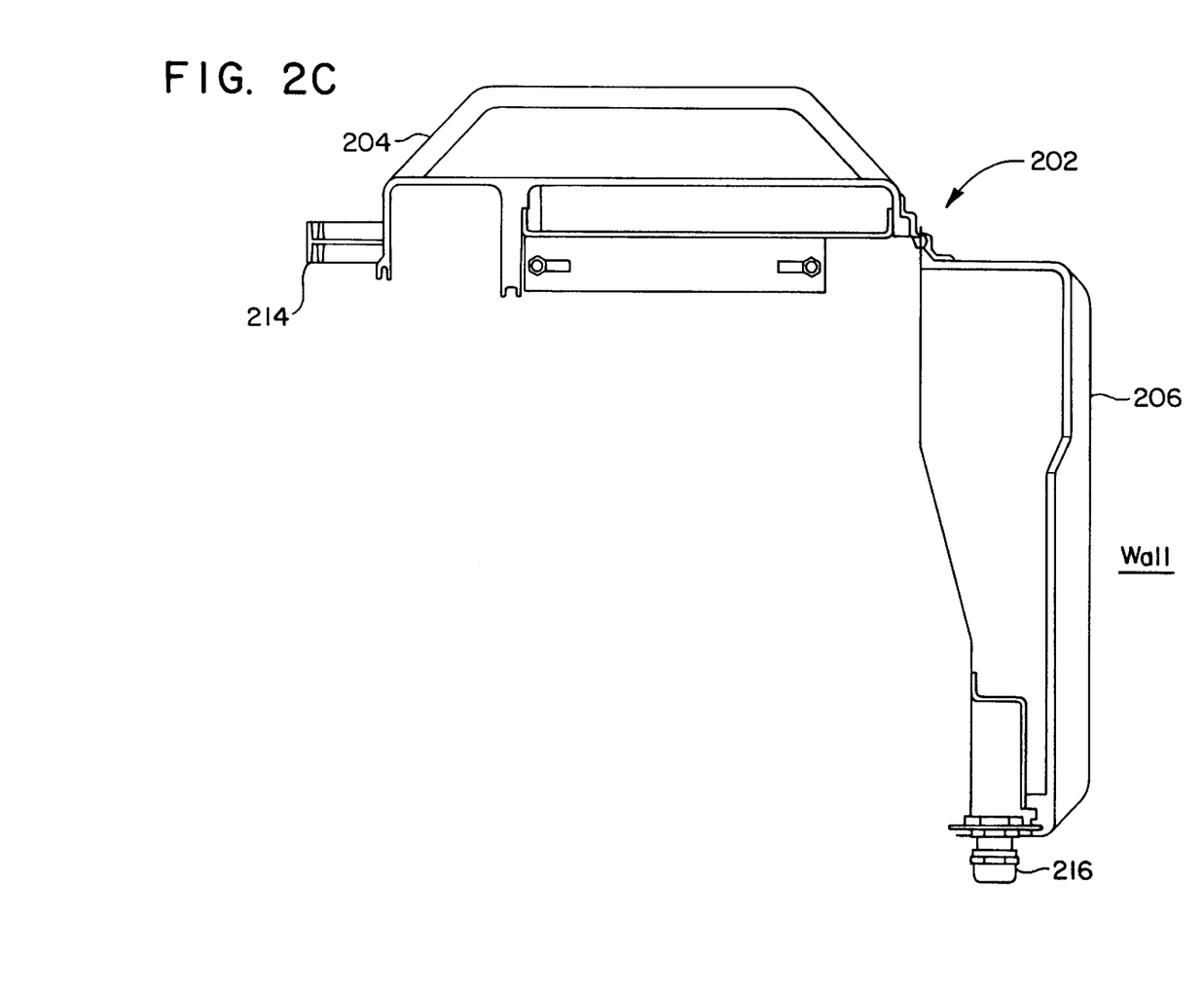
FIG. 2C is a right side elevational view of the base station of FIG. 2B when the chassis is in the open position.

FIG. 2C is a right side elevational, cross-sectional view of the aluminum case 202 of FIG. 2B when the case is in the fully open position.

Figure 2D:
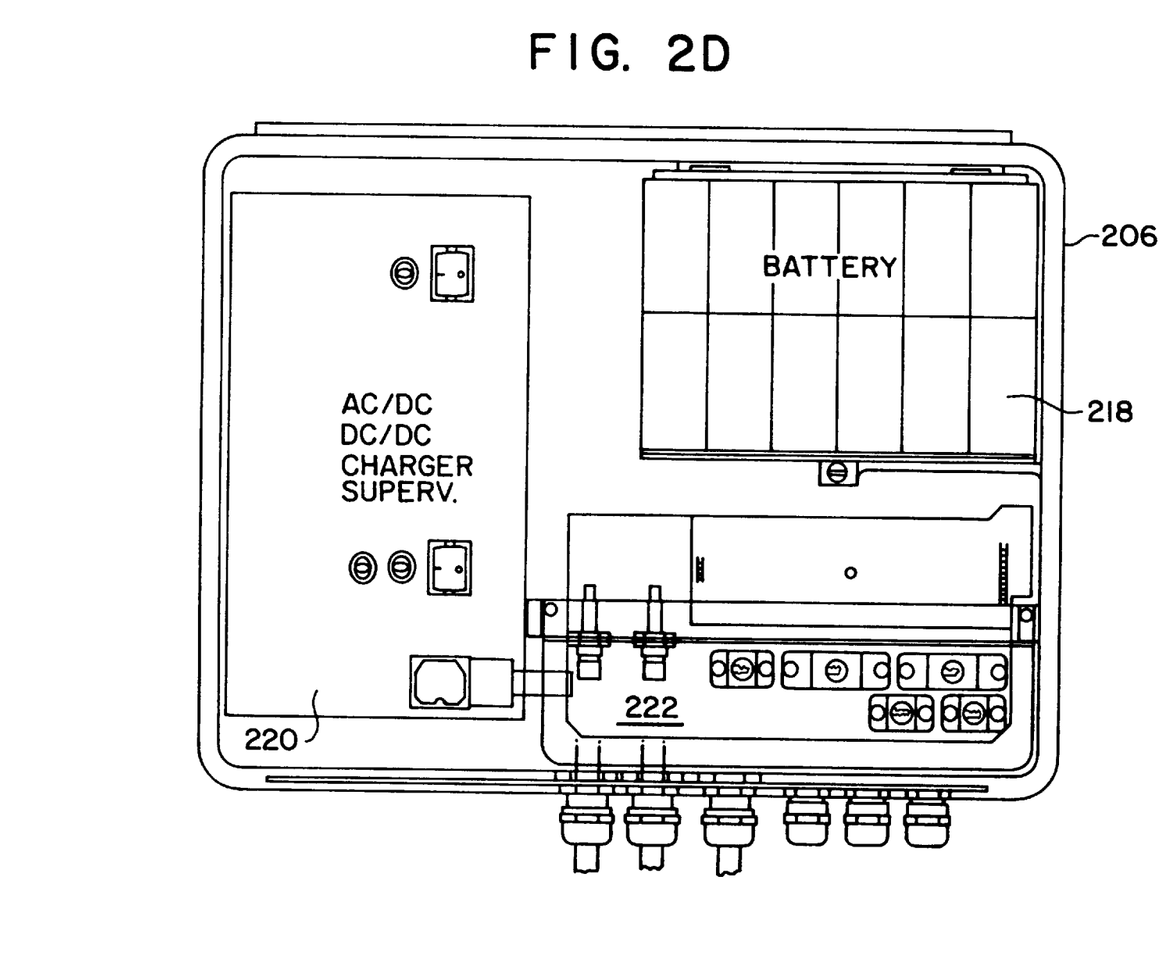
FIG. 2D is a front view of the wall mounted section of the base station of the invention of FIG. 2A with the cover removed.

FIG. 2D is a front elevational view of the base station 200 of FIG. 2A with the cover removed. The electrical components of the base station 200 are shown mounted in the aluminum case 202. The wall section 206 of the case 202 of FIG. 2D contains a battery 218, a power section 220 and input/output connector section 222.

Figure 3A:
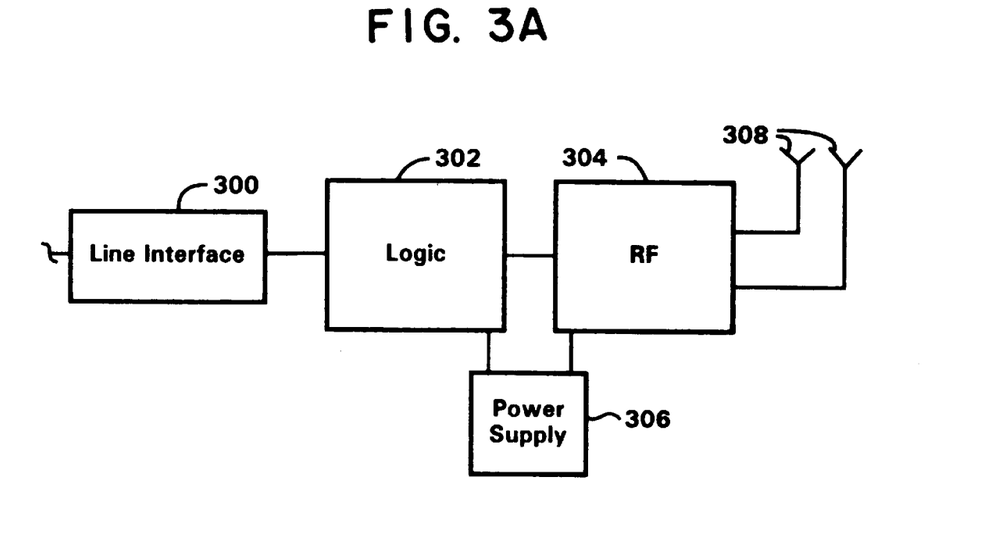
FIGS. 3A and 3B are schematic block diagrams of the single system mode and dual system mode embodiments, respectively, of a base station according to the teachings of the present invention.

FIG. 3A is a block level schematic diagram of the single mode embodiment of base station 200. Base station 200 comprises logic circuitry 302, RF circuitry 304, a line interface 300 and antennas 308. Power supply 306 supplies power to logic circuitry 302 and RF circuitry 304. RF circuitry 304 transmits or receives a signal on antenna 308. Logic circuitry 302 provides the control and command functions. Line interface 300 provides an interface to the system.

Figure 3B:
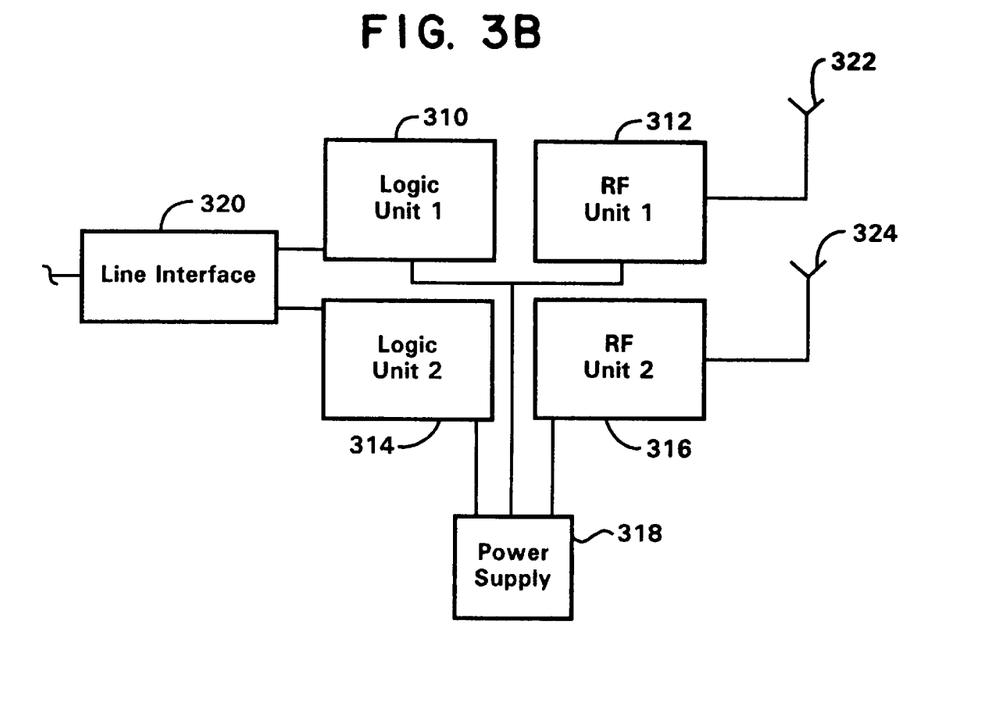

FIG. 3B is a block level schematic diagram of the dual mode embodiment base station 200. In the dual mode embodiment base station 200 comprises logic circuitry 310 and RF circuitry 312 for System I, logic circuitry 314 and RF circuitry 316 for System II, power supply 318, line interface 320, System I antenna 322 and, System II antenna 324. The various sections perform identical functions for each system as described above for the single mode base station. The line interface 320 provides an interface to the system for both System I and System II.

Figure 4A:
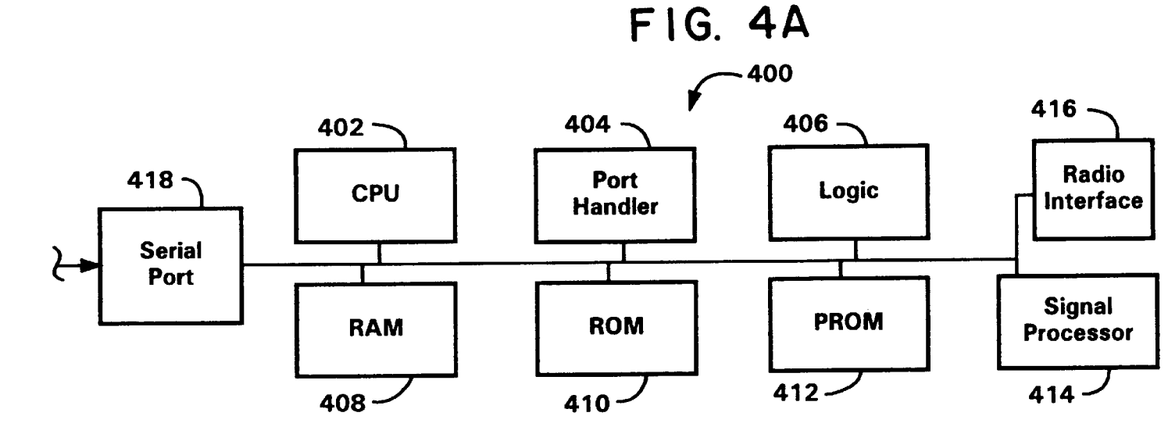
FIGS. 4A and 4B are schematic block diagrams of logic circuitry and RF circuitry, respectively, of a base station according to the teachings of the present invention.
Figure 4B:
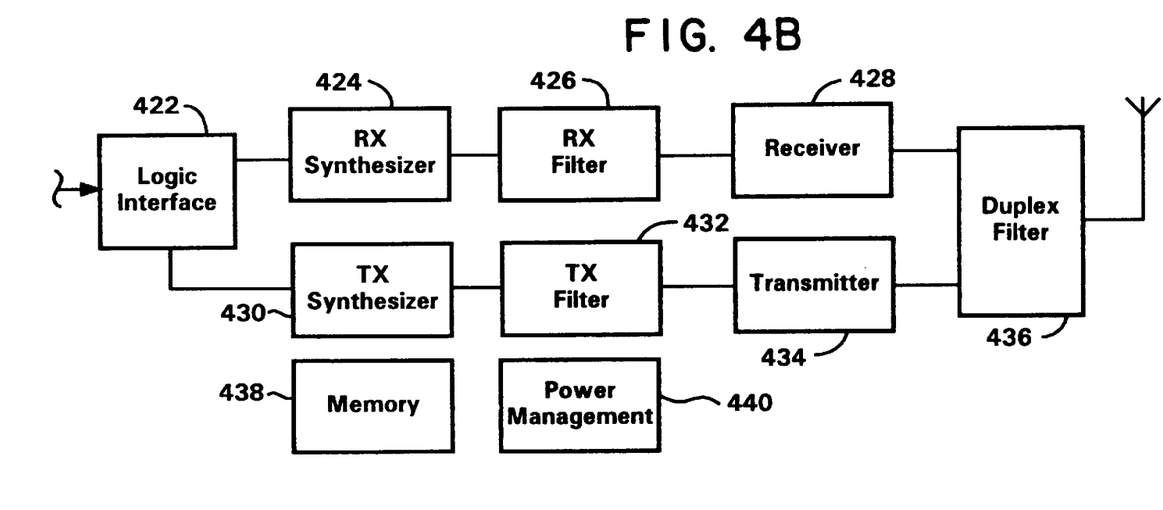

FIGS. 4A and 4B are schematic block diagrams of logic circuitry and RF circuitry, respectively, for each logic circuitry and RF circuitry section of the present invention. Logic circuitry 400 comprises CpU 402, port handler 404, logic circuitry 406, RAM 408, ROM 410, PROM 412, a signal processor 414, a radio interface 416 and a serial port 418.

RF circuitry 420 comprises logic interface 422, receiver (RX) synthesizer 424, receiver (RX) filter 426, receiver 428, transmit (TX) synthesizer 430, transmit (TX) filter 432, transmitter 434, a duplex filter 436, memory 438 and power management circuitry 440.

Figure 5:
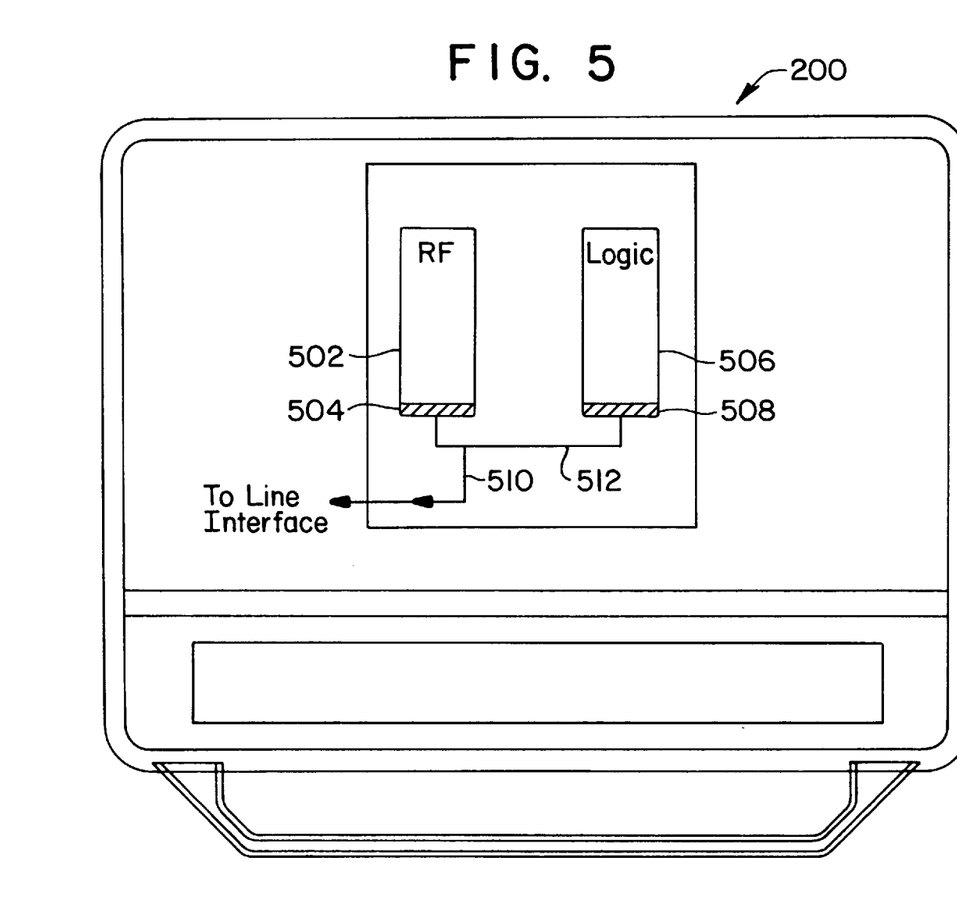
FIG. 5 is a front elevational, cross-sectional view of the single mode embodiment of the base station of FIG. 2A with the cover removed.

FIG. 5 is a front elevational, cross-sectional view of the single mode embodiment of the base station 200 of FIG. 2A with the cover removed. The single mode embodiment of the modular base station supports a single system. In this embodiment of the modular base station, the RF and logic circuitry for the system is contained in RF Card 502 and Logic Card 506, respectively. The RF Card 502 and Logic Card 502 are PCMCIA Type III cards, mounted in PCMCIA Type III slots 504 and 508, respectively. Each of slots 504, 510 interface with PCMCIA bus 510. PCMCIA bus 508 provides electrical connections to line interface 512.

Figure 6:
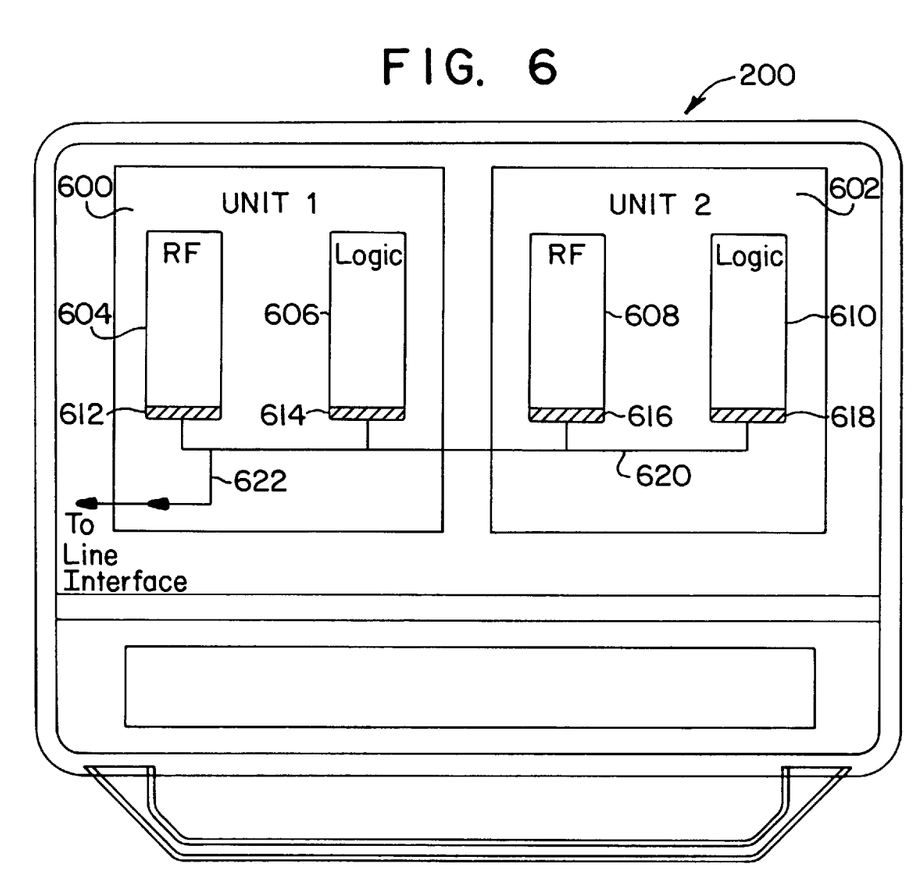
FIG. 6 is a front elevational, cross-sectional view of the dual mode embodiment of the base station of FIG. 2A with the cover removed.

FIG. 6 is a front elevational, cross-sectional view of the dual mode embodiment of the base station 200 of FIG. 2A with the cover removed. The dual mode embodiment of the modular base station supports two systems at one time. In this embodiment of the modular base station, Unit I 600 and base station Unit II 602, each contain the RF and logic circuitry for a separate system. The circuitry for Unit I 600 is contained on RF Card 604 and Logic Card 606. The circuitry for Unit II 602 is contained on RF Card 608 and Logic Card 610. The RF Card 604 and Logic Card 606 for System Unit I 600 are mounted in PCMCIA Type III slots, 612 and 614, respectively. The RF Card 608 and Logic Card 610 for System Unit II 602 are mounted in PCMCIA Type III slots 616 and 618, respectively.

Each of slots 612, 614, 616 and 618 interface with PCMCIA bus 620. PCMCIA bus 620 provides electrical connections to line interface 622.

Figure 7A:
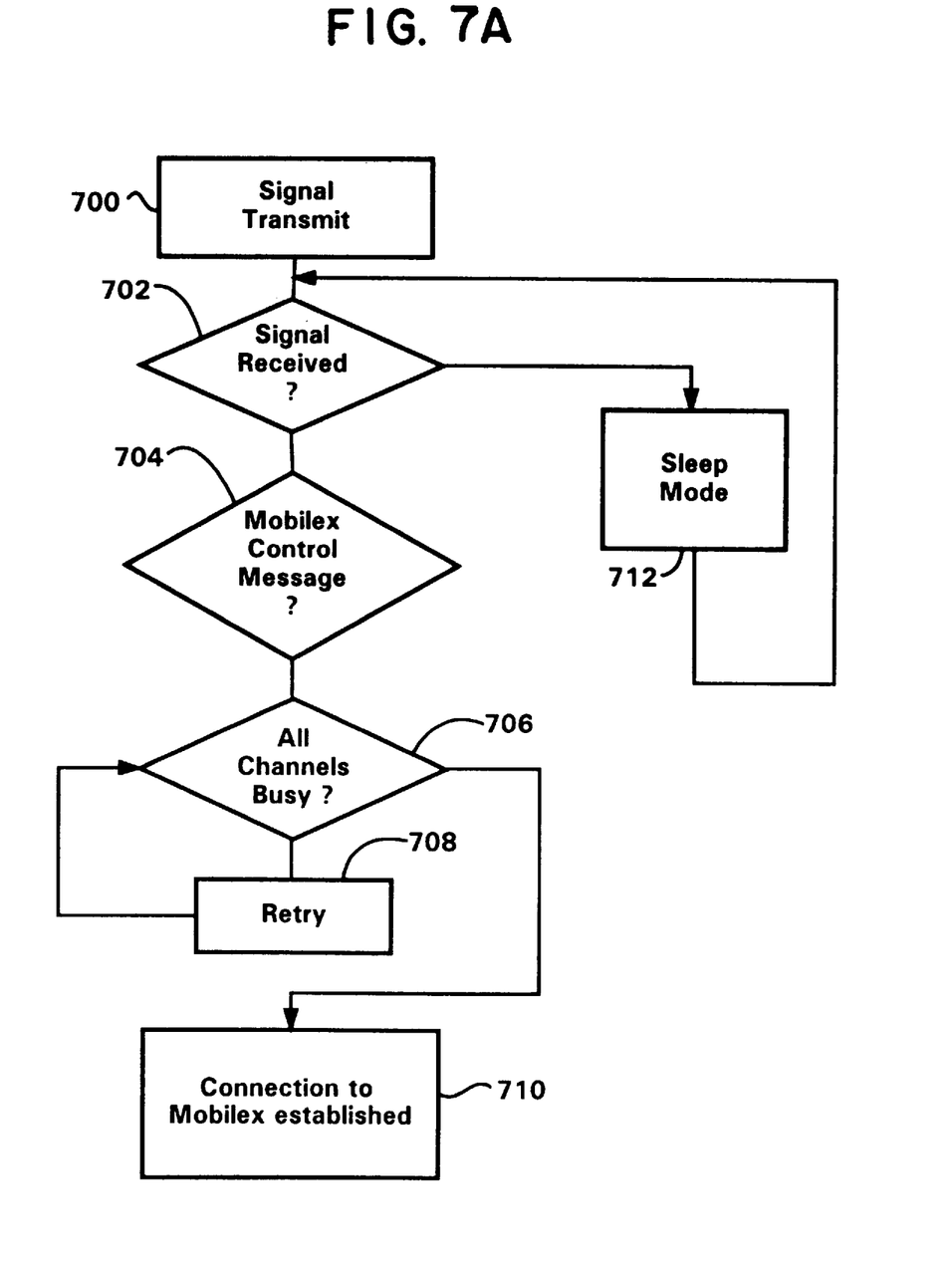
FIG. 7A and FIG. 7B are flow diagrams illustrating steps performed within the single mode base station and dual mode base station, respectively, of the present invention.
Figure 7B:
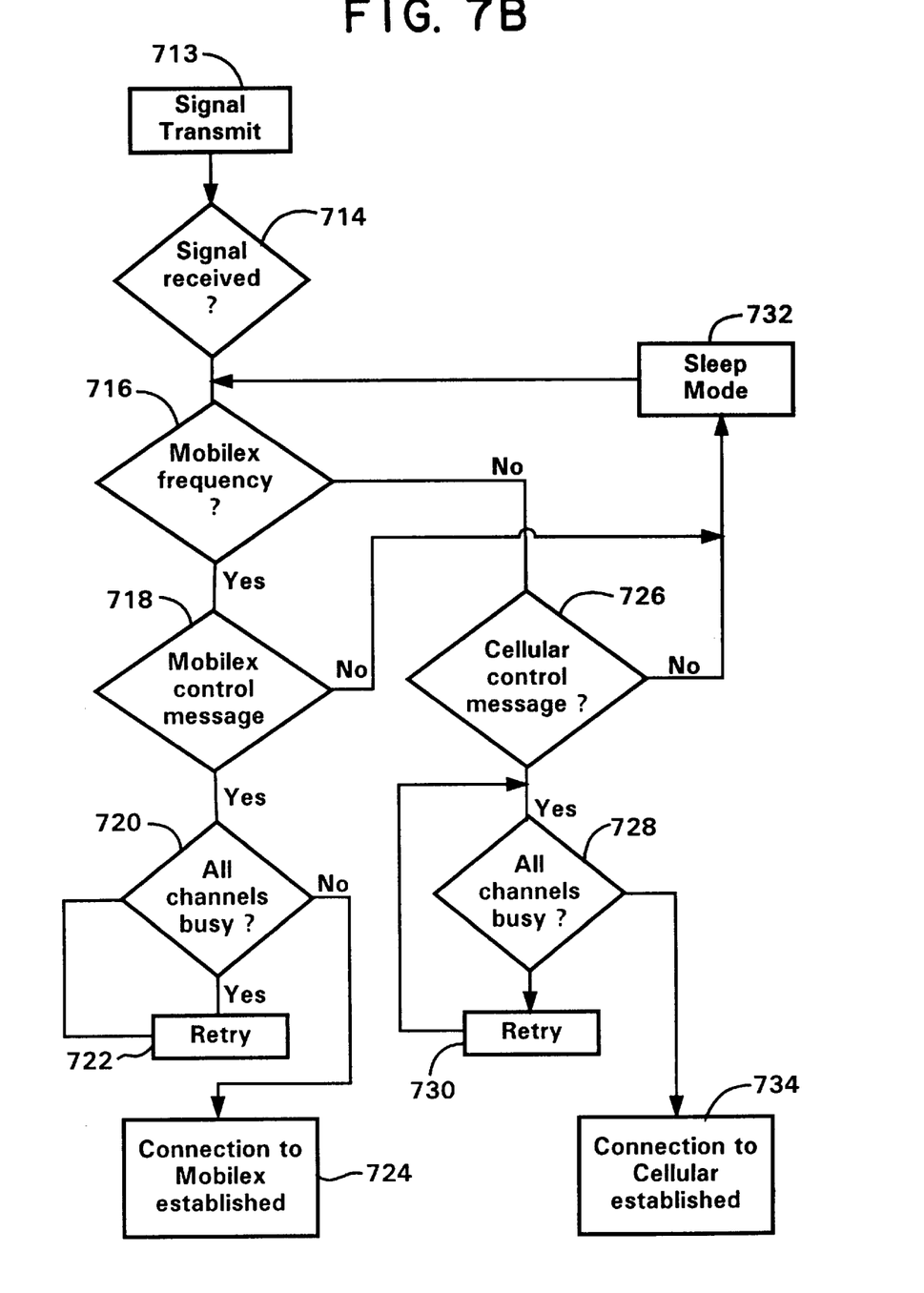

Referring now to FIGS. 7A and 7B, therein are shown flow diagrams illustrating steps performed within the single mode base station and dual mode base station, respectively, of the present invention.

FIG. 7A illustrates process steps performed by the single mode Mobitex base station of the present invention upon receiving an access signal from a mobile station. At Step 700, an access signal is transmitted by a mobile station. At Step 702, it is determined in RF circuitry 304 if the signal is on a Mobitex frequency. If the signal is not received on a Mobitex frequency, the process moves to Step 712, where the base station returns to the sleep mode and waits for another RF signal. If, however, at Step 702, it is determined that the signal is on a Mobitex frequency, the process moves to Step 704. At Step 704, a determination is made within logic circuitry 302 as to whether the received signal was a Mobitex control message. If the signal is not a Mobitex control message, the process moves to Step 712, where the base station returns to the sleep mode and waits for another RF signal. If, however, at Step 704, the received signal was a Mobitex control message, the process moves to Step 706. Next, at Step 706, a determination is made through the line interface as to whether all channels of the Mobitex system are busy. If all channels are busy, the process moves to Step 708 where a retry of Step 706 is directed. Upon finding that a channel is free in Step 706, the process will move to Step 710 where the connection between the Mobitex system and base station is established.

FIG. 7B illustrates process steps performed by a dual mode Mobitex/cellular system base station of the present invention upon receiving an access signal. At Step 713, an access signal is transmitted by a mobile station. At Step 714, it is determined if the signal was transmitted on a correct frequency, i.e., a Mobitex or a control frequency of the cellular system. If it is determined that the signal is on a correct Mobitex or cellular control frequency, the process moves to Step 716. At Step 716, a determination is made as to whether the frequency was a Mobitex frequency. If the frequency was a Mobitex frequency, the process moves to Step 718. At Step 718, a determination is made as to whether the signal was a Mobitex control message. If it is determined that the signal is not a Mobitex control signal, the process moves to the sleep mode of Step 732. If, however, it is determined at Step 718, that the signal was a Mobitex control message, the process moves to Step 720 where a determination is made as to whether or not all Mobitex channels are busy. If all Mobitex channels are busy, the process moves to Step 722. At Step 722, a retry is directed for a Mobitex channel. Steps 722 and 720 may be repeated for a certain predetermined time period until a free channel is found at Step 720. Next, the process moves to Step 724 where a connection to Mobitex is established.

If, however, it is determined at Step 716 that the frequency is not a Mobitex frequency, the process moves to Step 726. At Step 726, a determination is made as to whether the signal is a control message of the cellular system. If the signal is not a control message of the cellular system, the process moves to the sleep mode of Step 732 and waits to receive another RF signal. If, however, at Step 726, it is determined that the signal is a control message of the cellular system, the process moves to Step 728. At Step 728, a determination is made as to whether all cellular system channels are busy. If all channels are busy, the process moves to Step 730. At Step 730 a retry is directed for a Mobitex channel. Steps 728 and 730 may be repeated for a certain predetermined time period until a free channel is found at Step 728. Next, the process moves to Step 734 where a connection is established to the cellular network.

It is believed that the operation and construction of the present invention will be apparent form the foregoing description and, while the invention shown has been characterized as particular embodiments, changes and modifications may be made therein without departing from the spirit and scope of the invention as defined in the following claims.

What is claimed is:

1. A base station for use in a plurality of telecommunications systems operating according to different system standards, said base station comprising:

at least one PCMCIA card slot for removably mounting at least one system component of a system of said plurality of telecommunications systems;

a line interface connected to at least one of said plurality of telecommunications systems; and an interface for allowing electrical communication between said at least one means for removably mounting said line interface.

2. The base station of claim 1 in which said plurality of telecommunications systems comprises a single system and at least one PCMCIA card slot for removably mounting comprises a first PCMCIA card slot for removable mounting logic circuitry of said system and, a second PCMCIA card slot for removably mounting RF circuitry of said system and further, said base station further comprises a bus structure for providing electrical communication between said first and second means.

3. The base station of claim 1 in which said at least one PCMCIA card slot for removably mounting comprises a plurality of pairs of PCMCIA card slots, each pair of PCMCIA card slots comprising a first means and a corresponding second means, said first means of each pair of PCMCIA card slots for mounting logic circuitry of a selected system of said plurality of systems and said second means of each pair of PCMCIA card slots for mounting RF circuitry of said selected system.

4. The base station of claim 1 in which said at least one PCMCIA card slot for removably mounting comprises a plurality of means for removably mounting said at least one system component comprising a plurality of system components, said base station further comprising a bus structure providing electrical communication between said means for removably mounting.

5. The base station of claim 4 in which said plurality of system components comprises:

first RF circuitry for a first system of said plurality of telecommunications systems, said first RF circuitry for receiving an RF signal transmit at a frequency of said first system;

second RF circuitry for a second system of said plurality of telecommunications systems, said second RF circuitry for receiving an RF signal transmit at a frequency of said second system;

first logic circuitry for receiving an RF signal from said first RF circuitry and determining if said RF signal received from said first RF circuitry is a control signal of said first system; and second logic circuitry for receiving an RF signal from said second RF circuitry and determining if said RF signal received from said second RF circuitry is a control signal of said second system.

6. The base station of claim 5 in which said plurality of system components further comprise:

a first line interface for receiving a first logic signal from said first logic circuitry and switching a connection from said first logic circuitry to said first system; and a second line interface for receiving a second logic signal from said second logic circuitry and switching a connection from said second logic circuitry to said second system.

7. The base station of claim 1 in which said at least one telecommunications system comprises a system chosen from the group consisting of PCS, GSM, D-AMPS, AMPS, NMT, TACS and Mobitex systems.

8. The base station of claim 1 in which said at least one telecommunications system comprises a plurality of systems, said plurality of systems comprising systems chosen from the group consisting of PCS, GSM, D-AMPS, AMPS, NMT, TACS and Mobitex systems.

9. A base station for use in a plurality of telecommunications systems operating according to different system standards, said base station comprising:

a line interface connected to said plurality of communications systems;

first circuitry removably interfaced to the line interface through a PCMCIA card slot for a first system of said plurality of telecommunications systems, said first circuitry for receiving an RF signal transmit at a frequency of said first system;

second RF circuitry removable interfaced to the line interface through a PCMCIA card slot for a second system of said plurality of telecommunications systems, said second circuitry for receiving an RF signal transmit at a frequency of said second system;

first logic circuitry removable interfaced to the line interface through a PCMCIA card slot for receiving an RF signal from said first RF circuitry and determining if said RF signal received from said first RF circuitry is a control signal of said first system; and second logic circuitry removable interfaced to the line interface through a PCMCIA card slot for receiving an RF signal from said second RF circuitry and determining if said RF signal received from said second RF circuitry is a control signal of said second system.

10. The base station of claim 9, wherein said line interface further comprises:

a first line interface portion for receiving a first logic signal from said first logic circuitry and switching a connection from said first logic circuitry to said first system; and a second line interface portion for receiving a second logic signal from said second logic circuitry and switching a connection from said second logic circuitry to said second system.

* * * * *